(12) United States Patent
Inai (10) Patent No.: US 9,566,850 B2
(45) Date of Patent: Feb. 14, 2017

(54) EXTERIOR-MEMBER-EQUIPPED SEALING STRUCTURE

(71) Applicant: HONDA MOTOR CO., LTD., Tokyo (JP)

(72) Inventor: Yohei Inai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/323,224

(22) Filed: Jul. 3, 2014

(65) Prior Publication Data

US 2015/0007504 A1    Jan. 8, 2015

(30) Foreign Application Priority Data

Jul. 3, 2013   (JP) .................................. 2013-139887

(51) Int. Cl.
*B60J 10/25*    (2016.01)

(52) U.S. Cl.
CPC ................. *B60J 10/25* (2016.02); *B60J 10/84* (2016.02)

(58) Field of Classification Search
CPC . B60J 10/0017; B60J 10/0045; B60J 10/0091; B60J 10/081; B60J 10/083; B60J 10/21; B60J 10/25; B60J 10/40; B60J 10/78; B60J 10/84; B60J 10/86; B60J 10/87
USPC .......................................... 296/146.9; 49/502
See application file for complete search history.

(56) References Cited

U.S. PATENT DOCUMENTS

| | | | | |
|---|---|---|---|---|
| 4,544,198 | A * | 10/1985 | Ochiai et al. ................. | 296/155 |
| 5,106,149 | A * | 4/1992 | Glossop et al. .............. | 296/213 |
| 5,209,546 | A * | 5/1993 | Hasegawa et al. ........... | 296/213 |
| 5,651,578 | A * | 7/1997 | Mistopoulos et al. ..... | 296/146.9 |
| 6,443,519 | B1 * | 9/2002 | Betzl .............................. | 296/213 |
| 6,932,415 | B1 * | 8/2005 | Van Houzen et al. ..... | 296/146.2 |
| 8,312,689 | B2 * | 11/2012 | Terazawa et al. ........... | 52/716.5 |
| 8,360,504 | B2 * | 1/2013 | Masumoto .................... | 296/147 |
| 8,434,813 | B2 * | 5/2013 | Mori et al. ................. | 296/146.2 |
| 8,458,959 | B2 * | 6/2013 | Ohtake et al. .................. | 49/502 |
| 8,579,355 | B2 * | 11/2013 | Ogawa ........................ | 296/146.9 |
| 8,898,958 | B2 * | 12/2014 | Filipczak et al. .............. | 49/502 |
| 2014/0049067 | A1 * | 2/2014 | Kasuya et al. ............. | 296/146.5 |
| 2016/0176269 | A1 * | 6/2016 | Alhof ..................... | B60J 5/0402 49/502 |

FOREIGN PATENT DOCUMENTS

JP         4788996 B2    10/2011

OTHER PUBLICATIONS

With English Translation of Chinese Office Action dated Dec. 4, 2015, issued in Chinese Patent Application No. 201410314650.3.

* cited by examiner

*Primary Examiner* — Brian Mattei
*Assistant Examiner* — Catherine A Kelly
(74) *Attorney, Agent, or Firm* — Westerman, Hattori, Daniels & Adrian, LLP

(57) ABSTRACT

An exterior member-equipped sealing structure includes: a vertical seal extending downward from a portion above a door opening toward a front of a vehicle body; a front corner pane located forward of the door opening in the vehicle body; and a decorative member for sealing a gap between a lower end of the front corner pane and a front side door. The decorative member includes: a decorative portion for sealing a gap between the lower end of the front corner pane and the front side door; and a receiver extending from the decorative portion to a space under the lower end of the vertical seal.

11 Claims, 12 Drawing Sheets

EXTERIOR-MEMBER-EQUIPPED SEALING STRUCTURE

CROSS REFERENCES TO RELATED APPLICATIONS

The present application claims priority under 35 U.S.C. §119 to Japanese Patent Application No. 2013-139887, filed Jul. 3, 2013, entitled "Exterior Member-equipped Sealing Structure." The contents of this application are incorporated herein by reference in their entirety.

TECHNICAL FIELD

The present application relates to an exterior member-equipped sealing structure including a sealing member for sealing a gap between a door and a door opening with the door being closed at the door opening of a vehicle body.

BACKGROUND

In a known type of exterior member-equipped sealing structure, a quarter window is provided in a front pillar and a front fender, and a side door is provided at the rear of the quarter window in a vehicle body such that the side door can be freely opened or closed, a door sash of the side door extends along the rear side of the quarter window, and the front end of the side door extends from the door sash along the bottom of the quarter window (see, for example, Japanese Patent No. 4788996). In such an exterior member-equipped sealing structure, a sealing member extending along the vehicle body is formed along the door sash and the rear side of the quarter window.

In the side door, the front end extends from the door sash along the bottom of the quarter window. Thus, the shape of the side door relatively markedly changes near the bottom of the quarter window (near the base of the door sash). This marked change of the side door makes it difficult to extend the sealing member continuously downward via a portion near the base of the door sash. Thus, the sealing member needs to be discontinuous near the base of the door sash. In this structure, when the side door slightly opens, for example, water guided by the sealing member drops onto the side door from the lower end of the sealing member, and it would be possible that the dropped water splashes onto the side door and spatters into (enters) the cabin.

To prevent this spattering, it may be conceivable to dispose a receiver below the lower end of the sealing member such that the receiver receives water dropped from the lower end of the sealing member and guides the dropped water to prevent the water from falling onto the side door. By preventing water from dropping onto the side door, splashing of dropped water on the side door can be prevented, and thus, spattering (entering) of water into the cabin can also be prevented. This technique, however, requires an additional receiver, which increases the number of components.

The present application describes an exterior member-equipped sealing structure that can prevent water that has dropped from a lower end of a sealing member from entering a cabin without an increase in the number of components.

SUMMARY

In a first aspect, an exterior member-equipped sealing structure includes: a sealing member configured to seal a gap between a door and a door opening of a vehicle body with the door covering the door opening; a vertical seal included in the sealing member and continuously extending downward from a portion above the door opening toward at least one of a front side or a rear side of the vehicle body; an exterior member being in contact with an outside of the vertical seal in a vehicle width direction and located on the door opening at a side of the at least one of a front side or a rear side of the vehicle body; and a decorative member located at a lower end of the exterior member and covering the lower end of the exterior member. The decorative member includes a decorative portion covering the lower end of the exterior member, and a receiver continuously extending from the decorative portion to a space below a lower end of the vertical seal and covering the lower end of the vertical seal from below.

In a second aspect, the receiver is located below the lower end of the vertical seal, and includes a bottom portion facing an entire lower periphery of the lower end of the vertical seal.

In a third aspect, while the door is closed, an inner panel of the door is disposed on an outer side of the vehicle body vertically below the decorative member, and the receiver is tilted downward from an outside toward an inside in a vehicle width direction.

In a fourth aspect, the receiver is tilted downward toward the front of the vehicle body.

In a fifth aspect, the receiver includes a wall continuously extending from an inner end of the bottom portion in a vehicle width direction to a portion above the lower end of the vertical seal.

In the first aspect, the decorative member is located at the lower end of the exterior member, the receiver continuously extends from the decorative portion of the decorative member, and the receiver covers a space below the lower end of the vertical seal. This configuration enables the receiver to receive water dropped from the lower end of the vertical seal so that the received water is guided not to fall onto the door. Since water does not fall onto the door, it is possible to prevent dropped water from being splashed on the door and spattering into (entering) the cabin.

In addition, the receiver continuously extends from the decorative portion of the decorative member. The decorative portion is a portion covering the lower end of the exterior member. Continuous formation of the receiver to the decorative portion enables the decorative portion and the receiver to be formed as a single member. In this manner, the receiver can be provided without an increase in the number of components.

In the second aspect, the bottom portion of the receiver is located below the lower end of the vertical seal, and the bottom portion faces the entire lower periphery of the lower end. This configuration enables all the water dropped from the lower end of the vertical seal to be received by the bottom portion of the receiver, thereby suitably reducing falling of water onto the door.

In the third aspect, the receiver is tilted downward from outside toward inside in the vehicle width direction. Thus, water dropped from the lower end of the vertical seal is received by the receiver, and the received water is guided inward in the vehicle width direction by the receiver. This configuration can prevent water dropped from the lower end of the vertical seal from hitting the door and spattering into (entering) the cabin.

In the fourth aspect, the receiver is tilted downward forward in the vehicle body. Thus, water received by the receiver does not remain in the receiver, and is guided toward the front of the vehicle body. Water received by the receiver can be guided away from a passenger.

In the fifth aspect, the receiver includes the wall, and the wall continuously extends from the inner end of the bottom portion to the portion above the lower end of the vertical seal. Thus, the wall can reduce splashing of water dropped from the lower end of the vertical seal inward in the vehicle width direction. This configuration ensures that water dropped from the lower end of the vertical seal is guided toward the front of the vehicle body, thereby suitably controlling the position to which water received by the receiver is dropped.

BRIEF DESCRIPTION OF THE DRAWINGS

The advantages of the disclosure will become apparent in the following description taken in conjunction with the following drawings.

DETAILED DESCRIPTION

A preferred embodiment of the present application will be described with reference to the drawings. The terms "front (Fr)," "rear (Rr)," "left (L)," and "right (R)" are based on directions seen from a driver's point of view.

Embodiment

Figure 1:
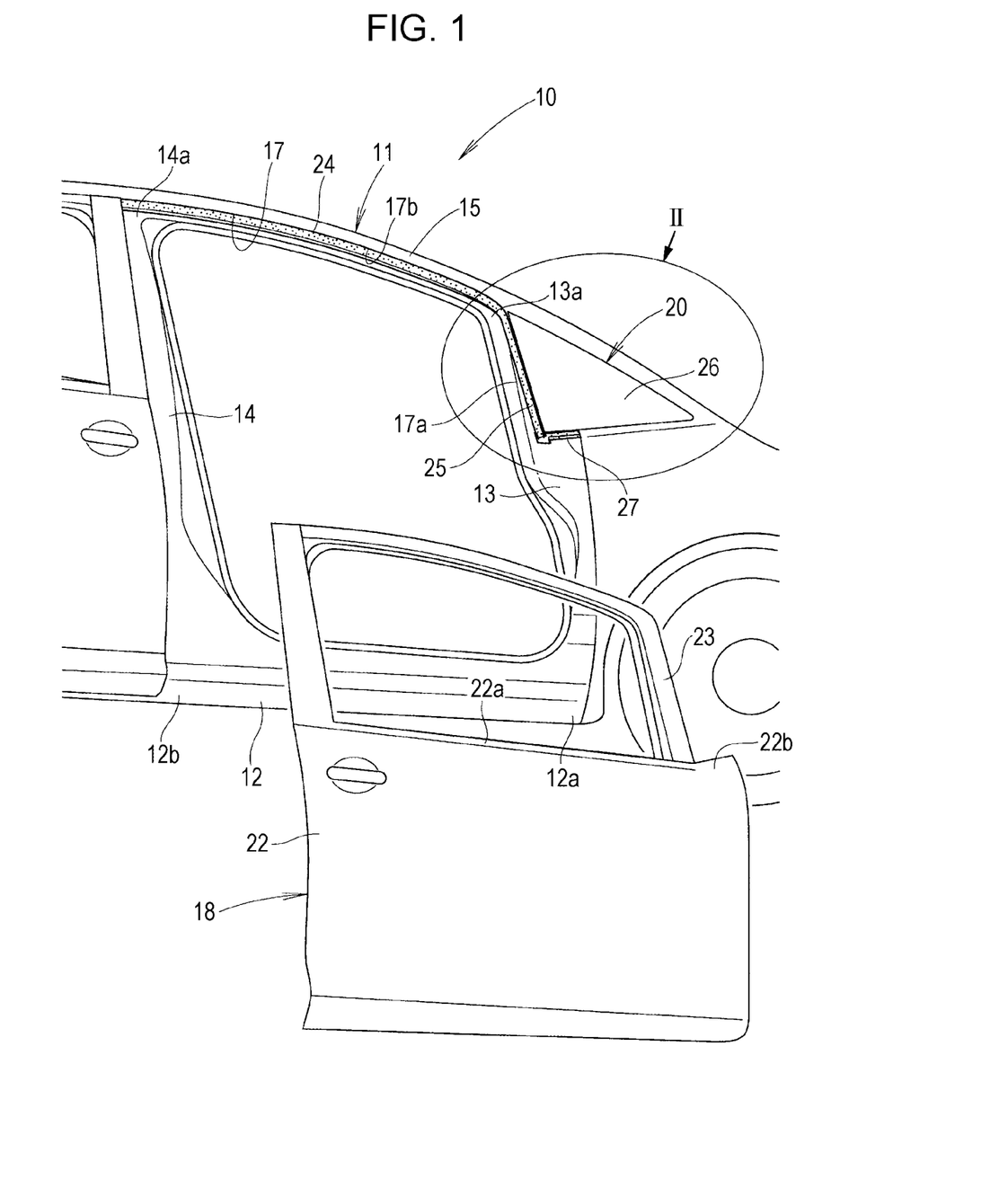
FIG. 1 is a side view illustrating a state in which a front side door is detached from a vehicle including an exterior member-equipped sealing structure of one embodiment of the present application.
Figure 2:
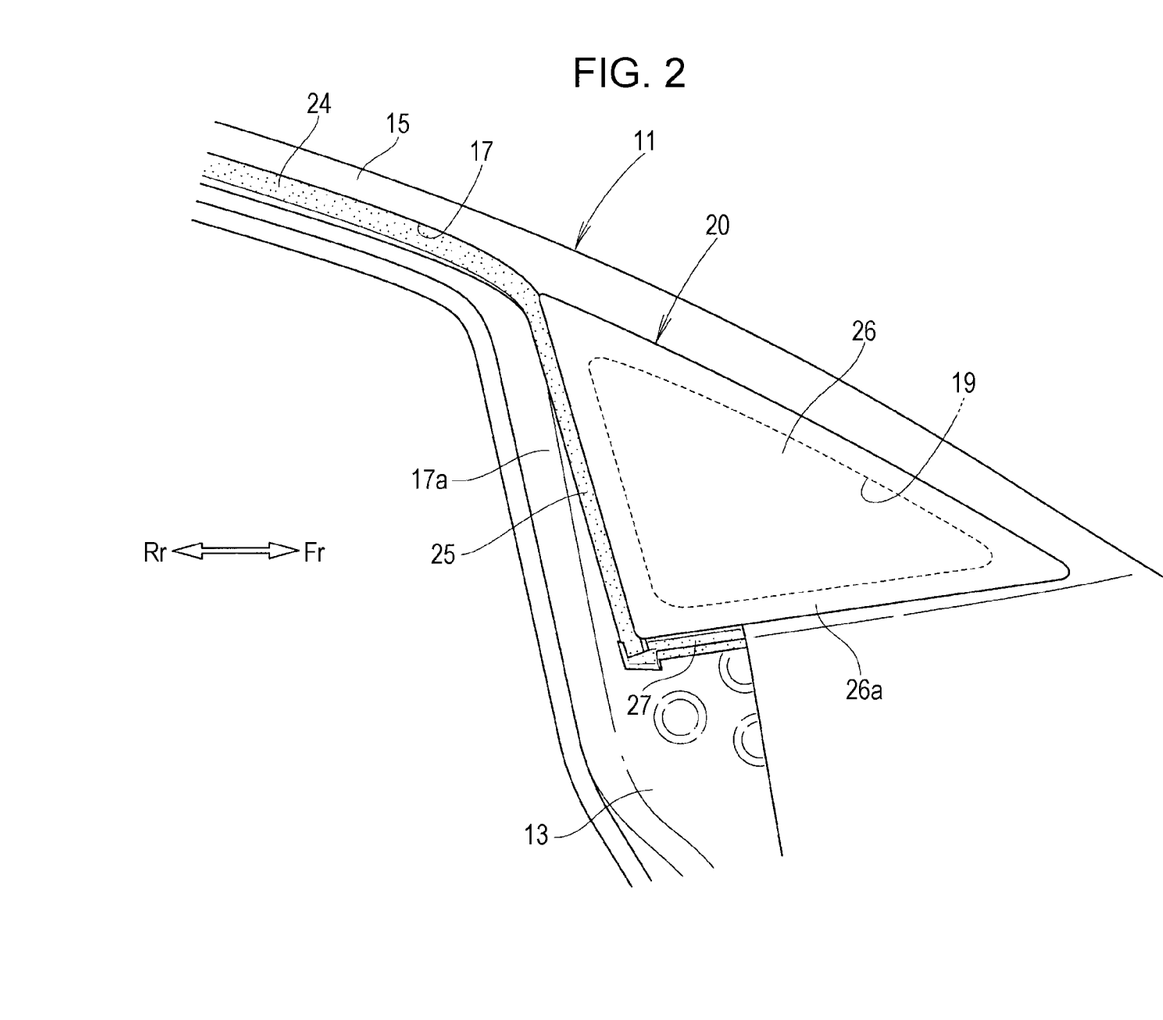
FIG. 2 is an enlarged view of portion II in FIG. 1.

An exterior member-equipped sealing structure 20 according to an embodiment will be described. As illustrated in FIGS. 1 and 2, a vehicle 10 includes: a side sill 12 located at a lower end of a vehicle body 11; a front pillar 13 rising upward from a front end 12a of the side sill 12; a center pillar 14 rising upward from a middle portion 12b of the side sill 12; and a roof rail 15 spanning between upper ends 13a and 14a of the center pillar 14 and the front pillar 13.

The vehicle 10 further includes: a door opening 17 formed by the side sill 12, the front pillar 13, the center pillar 14, and the roof rail 15; a front side door (door) 18 that is provided in the door opening 17 and can be opened or closed freely; and an exterior member-equipped sealing structure 20 adjacent to a front upper portion 17a of the door opening 17.

The front side door 18 includes: a door panel 22 that is attached to the front end (the front pillar 13) of the door opening 17 with a hinge interposed therebetween and can be opened or closed freely; and a door sash 23 provided on an upper portion 22a of the door panel 22. The upper portion 22a of the door panel 22 includes an upper front portion 22b extending forward from the door sash 23 in the vehicle body.

Figure 3:
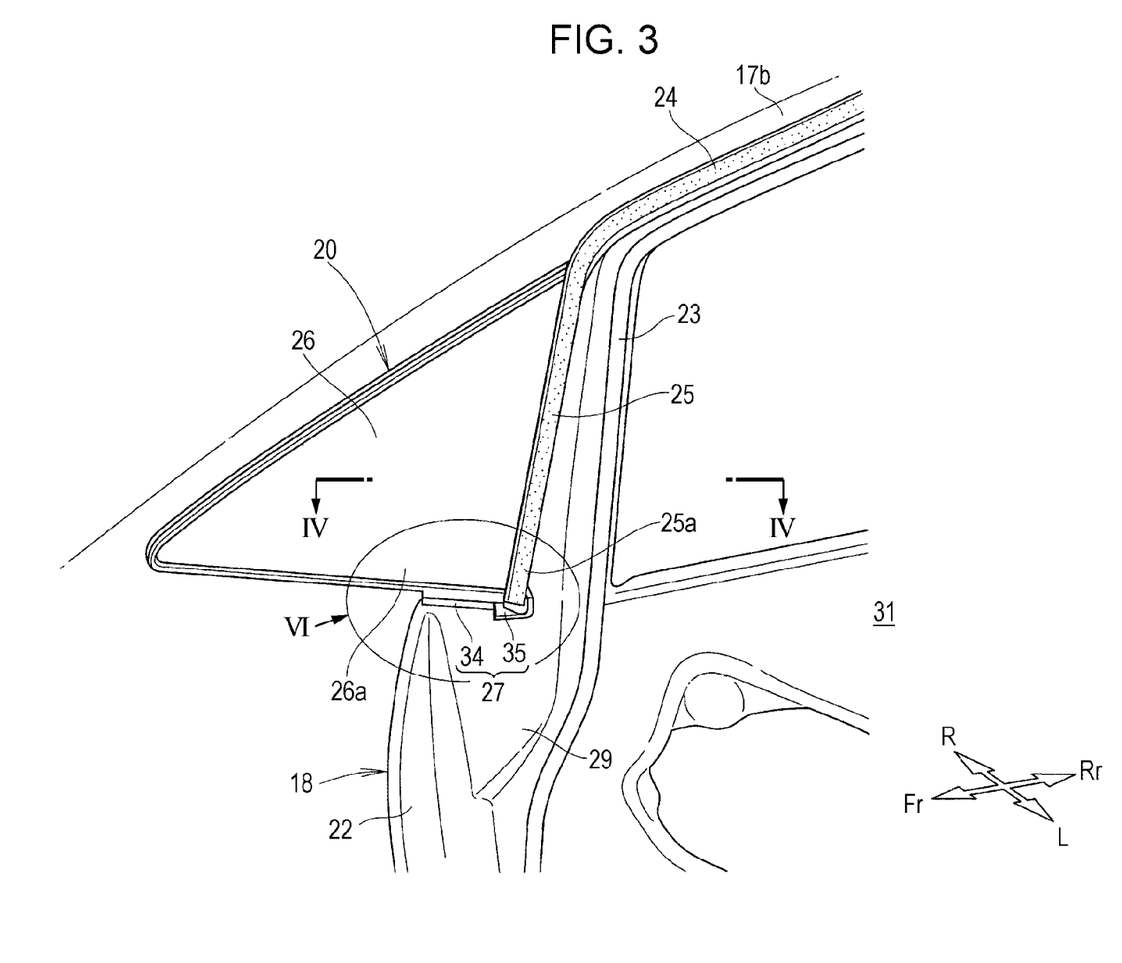
FIG. 3 is a perspective view of the exterior member-equipped sealing structure in FIG. 2 seen from the inside of the vehicle.
Figure 4:
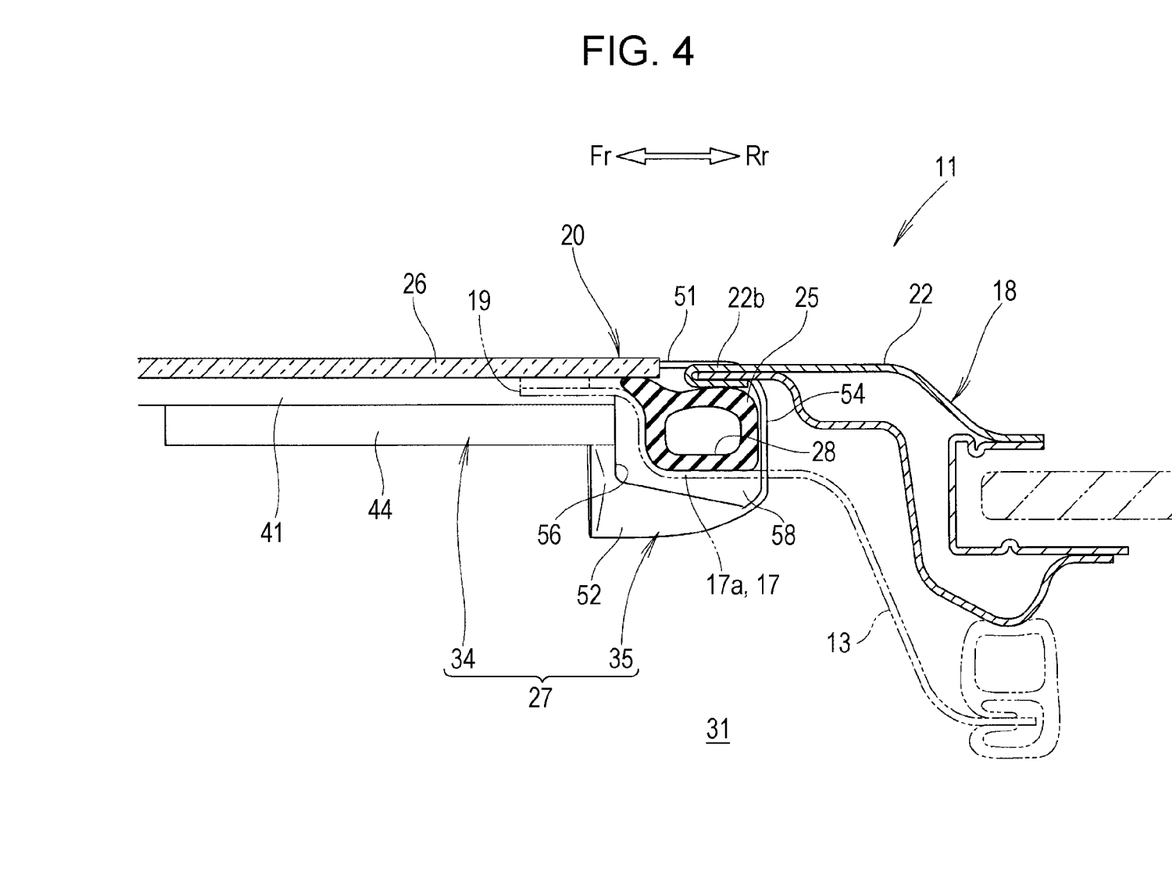
FIG. 4 is a cross-sectional view taken along line IV-IV in FIG. 3.

As illustrated in FIGS. 3 and 4, the exterior member-equipped sealing structure 20 includes: a vertical seal 25 continuously extending downward from above the door opening 17 toward the front of the vehicle body; a front corner pane (an exterior member) 26 in contact with the outer side of the vertical seal 25 in the vehicle width direction; and a decorative member 27 provided on a lower end 26a of the front corner pane 26.

The vertical seal 25 is a hollow sealing member included in a sealing member 24 and constituting a front portion of the sealing member 24. The vertical seal 25 includes a hollow portion 28, and continuously extends downward from the upper portion 17b of the door opening 17 to the lower end 26a of the front corner pane 26 along the front upper portion 17a of the door opening 17 (see FIG. 2). Referring back to FIG. 1, the sealing member 24 is a sealing material that is provided along, for example, the upper portion 17b and the front upper portion 17a of the door opening 17 and seals a gap between the door opening 17 and the front side door 18.

Figure 5:
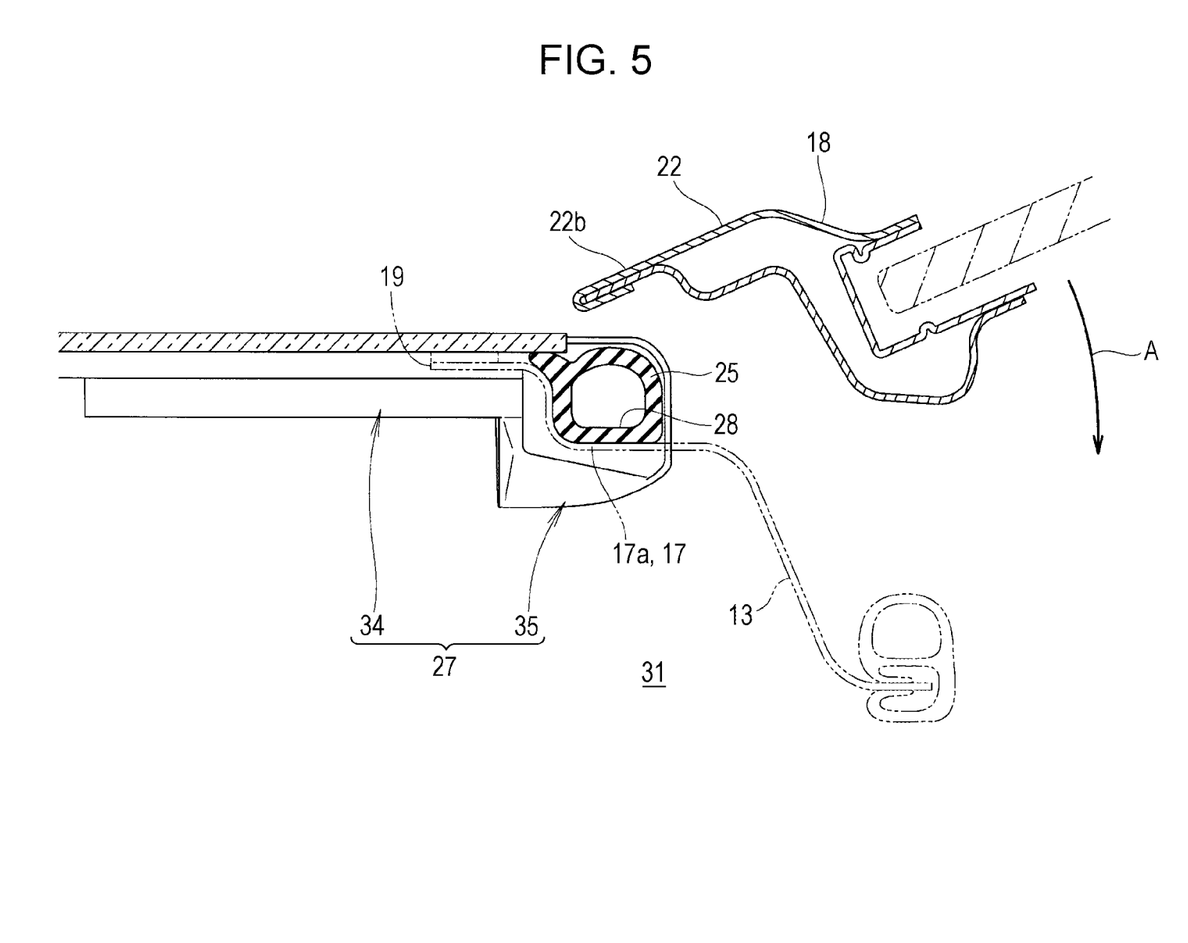
FIG. 5 is a cross-sectional view illustrating a state in which a front side door is open from the vehicle in FIG. 4.

As illustrated in FIG. 5, the front side door 18 moves from an open state as indicated by arrow A so that the door opening 17 is covered with the front side door 18. Then, the upper front portion 22b of the front side door 18 (the door panel 22) comes into contact with the vertical seal 25 (see FIG. 4). Referring back to FIG. 4, when the upper front portion 22b of the door panel 22 comes into contact with the vertical seal 25, a gap between the upper front portion 22b of the door panel 22 and the front upper portion 17a of the door opening 17 is sealed by the vertical seal 25.

As illustrated in FIG. 2, the front corner pane 26 is a quarter window pane (see also FIG. 3) that is disposed in an opening 19 of the front pillar 13 and is substantially triangular. Referring back to FIG. 4, the front corner pane 26 is in contact with the outside of the vertical seal 25 in the vehicle width direction (i.e., in contact with the outside of a cabin 31), and is located forward of the door opening 17 in the vehicle body.

Figure 6:
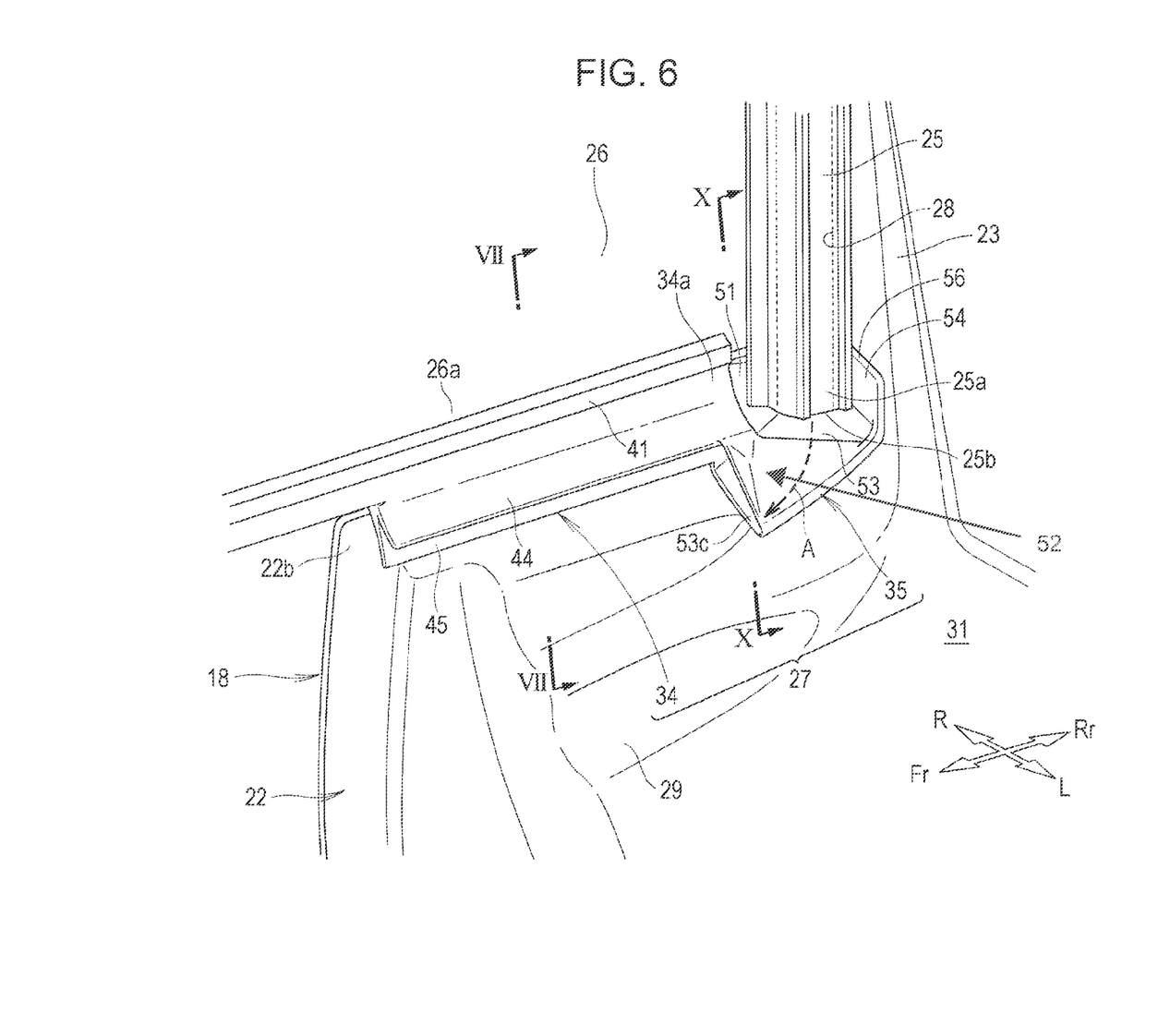
FIG. 6 is an enlarged view of portion VI in FIG. 3.

As illustrated in FIG. 6, the decorative member 27 is a member that is provided on the lower end 26a of the front corner pane 26 and seals a gap between the lower end 26a of the front corner pane 26 and the upper front portion 22b of the front side door 18 (the door panel 22). The decorative member 27 includes: a decorative portion 34 covering the lower end 26a of the front corner pane 26; and a receiver 35 continuously extending from the decorative portion 34 and covering a lower end 25a of the vertical seal 25 from below.

Figure 7:
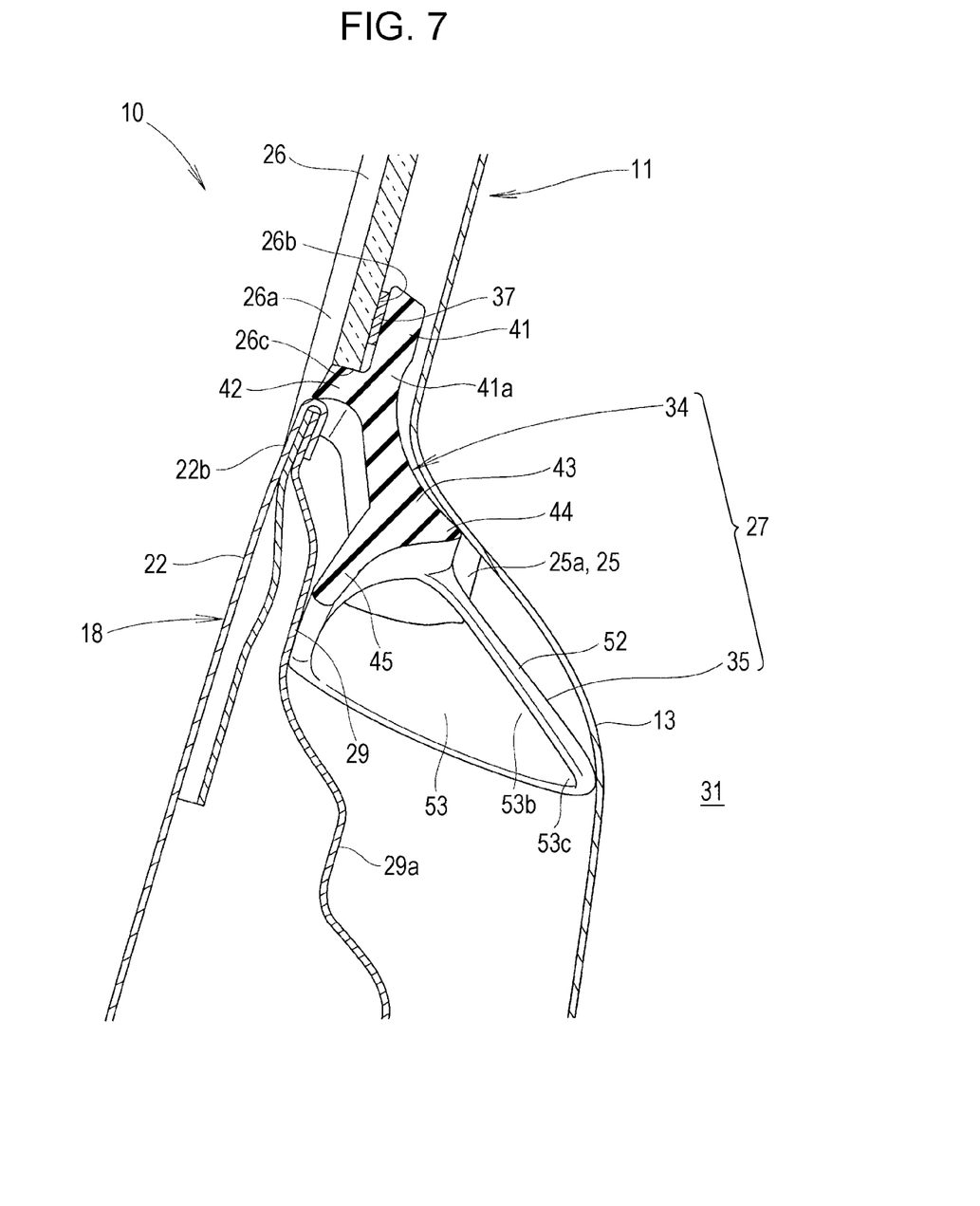
FIG. 7 is a cross-sectional view taken along line VII-VII in FIG. 6.

As illustrated in FIG. 7, the decorative portion 34 includes a joint portion 41 bonded to a lower end back surface 26b of the front corner pane 26 with an adhesive 37, a protrusion 42 protruding from a lower end 41a of the joint portion 41 outward in the vehicle width direction, and a sealing portion 43 extending downward from the lower end 41a of the joint portion 41.

By joining the joint portion 41 to the lower end back surface 26b of the front corner pane 26 with the adhesive 37, the decorative portion 34 is joined to the lower end 26a of the front corner pane 26. By bonding the joint portion 41 to the lower end back surface 26b, the lower end 26a (specifically the lower end back surface 26b and a lower periphery 26c of the lower end 26a) of the front corner pane 26 is covered with the joint portion 41 and the protrusion 42 from the side facing the cabin 31. In this manner, the lower end 26a of the front corner pane 26 is covered with the joint portion 41 and the protrusion 42 such that the lower end 26a cannot be seen from the cabin 31, thereby improving the aesthetic appearance of the vehicle 10.

The protrusion 42 protrudes outward in the width direction of the vehicle body so as to be in contact with the lower end 26a (specifically a lower periphery 26c of the lower end 26a, which will be hereinafter referred to as a lower end lower periphery 26c) of the front corner pane 26. The protrusion 42 is located between the lower end lower periphery 26c of the front corner pane 26 and the upper front portion 22b of the front side door 18 when the front side door 18 is closed.

In this manner, a gap between the lower end 26a of the front corner pane 26 and the upper front portion 22b of the front side door 18 can be decorated with the protrusion 42, thereby improving the aesthetic appearance of the vehicle 10. In addition, the presence of the protrusion 42 between the lower end lower periphery 26c of the front corner pane 26 and the upper front portion 22b of the front side door 18 enables a gap between the lower end lower periphery 26c and the upper front portion 22b to be sealed by the protrusion 42.

The sealing portion 43 includes an inner lip 44 in contact with the vehicle body 11 (specifically the front pillar 13) and an outer lip 45 that is configured to be in contact with the inner panel 29 of the front side door 18 (specifically the door panel 22). The inner lip 44 protrudes inward in the vehicle width direction such that the inner lip 44 is in contact with the front pillar 13. The outer lip 45 protrudes outward in the vehicle width direction such that the outer lip 45 is in contact with the inner panel 29.

Figure 8:
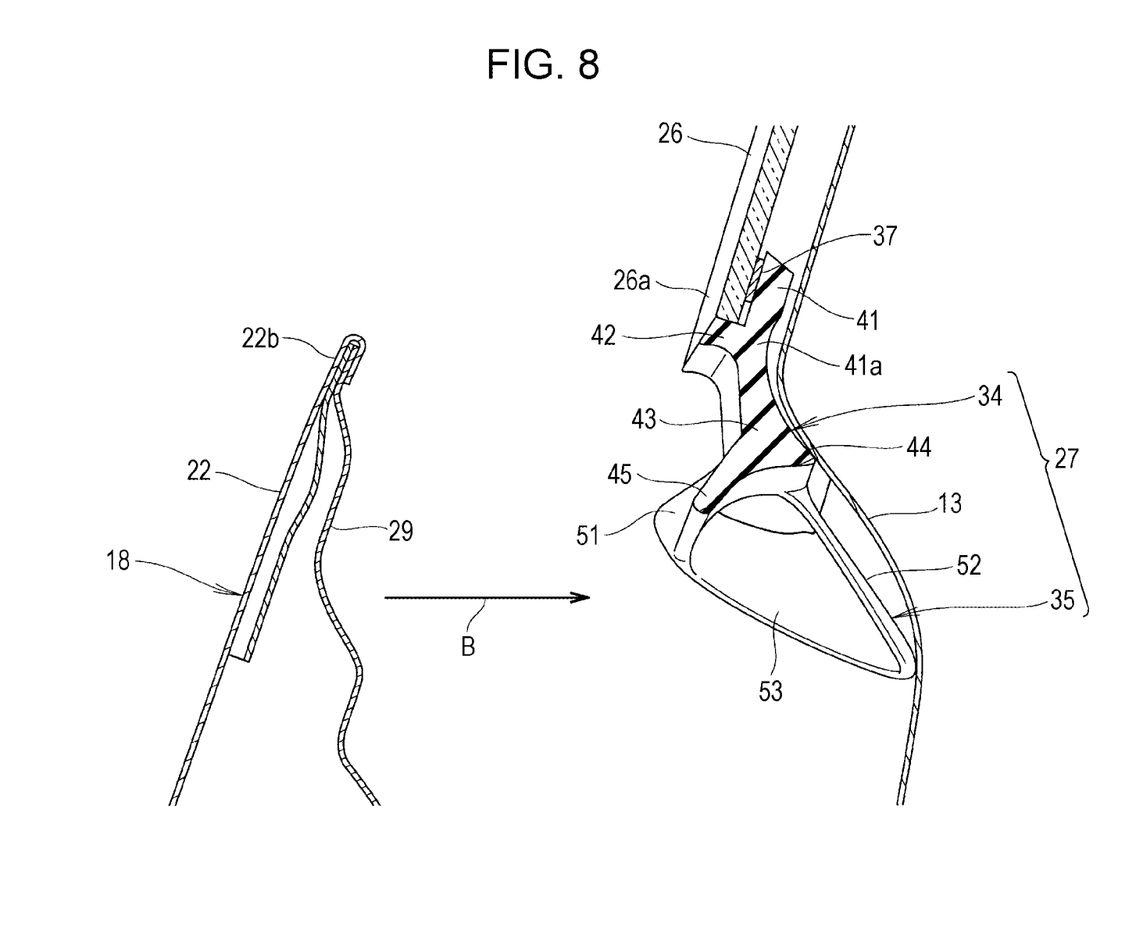
FIG. 8 is a cross-sectional view illustrating a state in which the front side door is open from the vehicle in FIG. 1.

As illustrated in FIG. 8, when the front side door 18 moves from an open state as indicated by arrow B, the door opening 17 (see FIG. 2) is closed with the front side door 18. By closing the door opening 17, the inner panel 29 of the door panel 22 comes into contact with the outer lip 45 (see FIG. 7).

Referring back to FIG. 7, the inner lip 44 is in contact with the front pillar 13. Thus, the contact of the inner panel 29 of the door panel 22 with the outer lip 45 causes a gap between the front pillar 13 and the inner panel 29 to be sealed by the sealing portion 43. That is, the decorative portion 34 is a member having a decorative property and a sealing property.

In the case where the door opening 17 (see FIG. 2) is closed with the front side door 18, a panel portion 29a of the inner panel 29 is located on the outer side of a vehicle vertically below the decorative member 27. That is, the panel portion 29a is located below the receiver 35. In addition, the panel portion 29a is located below the lower end 25a of the vertical seal 25.

As illustrated in FIG. 6, the receiver 35 continuously extends from a rear end 34a of the decorative portion 34 to a space below the lower end 25a of the vertical seal 25, and covers the lower end 25a of the vertical seal 25 from below. The decorative portion 34 is a member having a decorative property and a sealing property. In this manner, since the receiver 35 is continuous with the decorative portion 34 having the decorative property and the sealing property, the receiver 35 can be provided without an increase in the number of components.

The receiver 35 is tilted downward toward the front of the vehicle body, and is tilted downward from the outside toward the inside in the vehicle width direction. Thus, water that has dropped from the lower end 25a onto the receiver 35 by way of the hollow portion 28 of the vertical seal 25 can be guided forward in the vehicle body by the receiver 35, and can be guided from the outside toward the inside in the vehicle width direction as indicated by arrow A.

Figure 9:
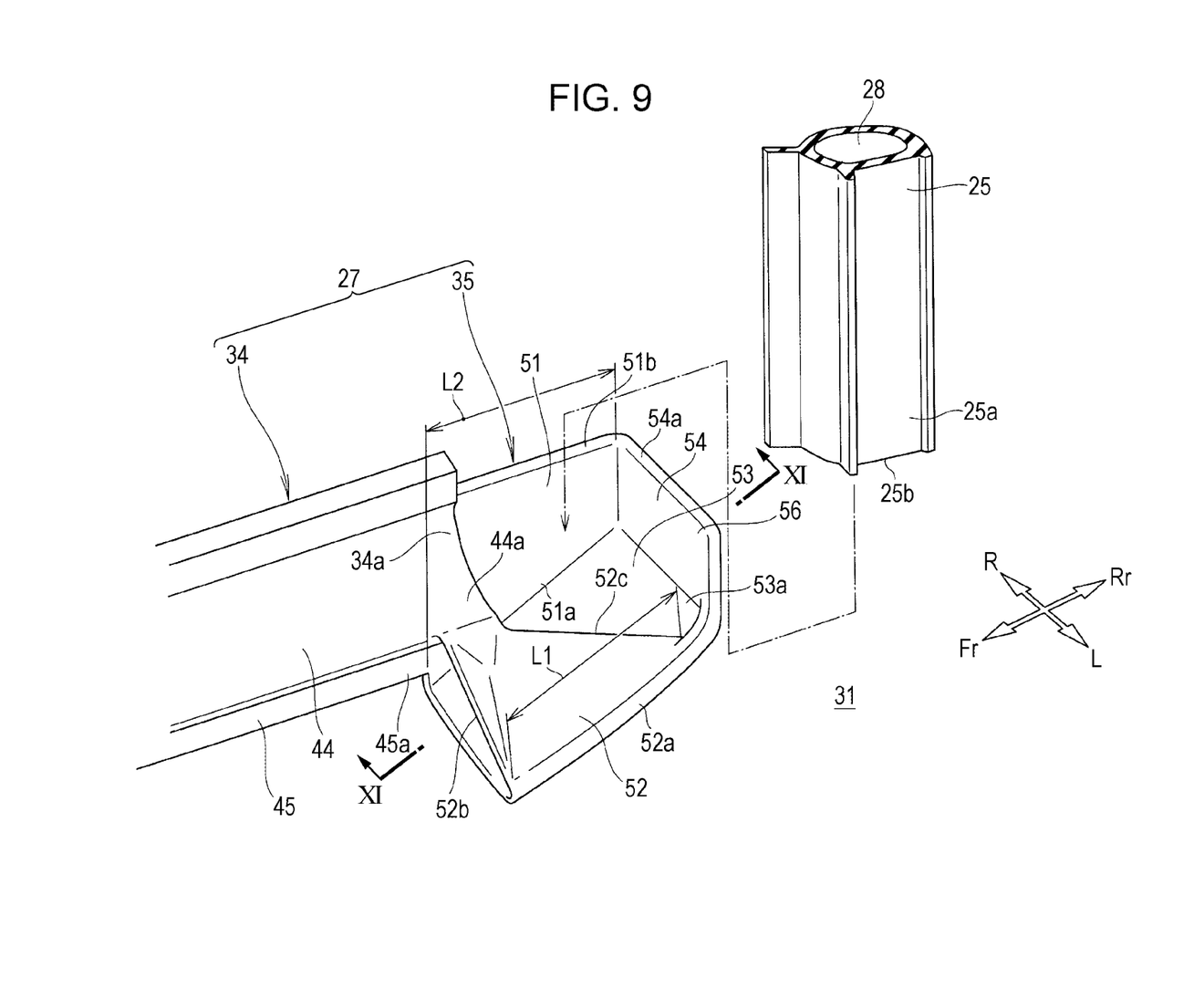
FIG. 9 is a disassembled perspective view of the exterior member-equipped sealing structure in FIG. 6.
Figure 10:
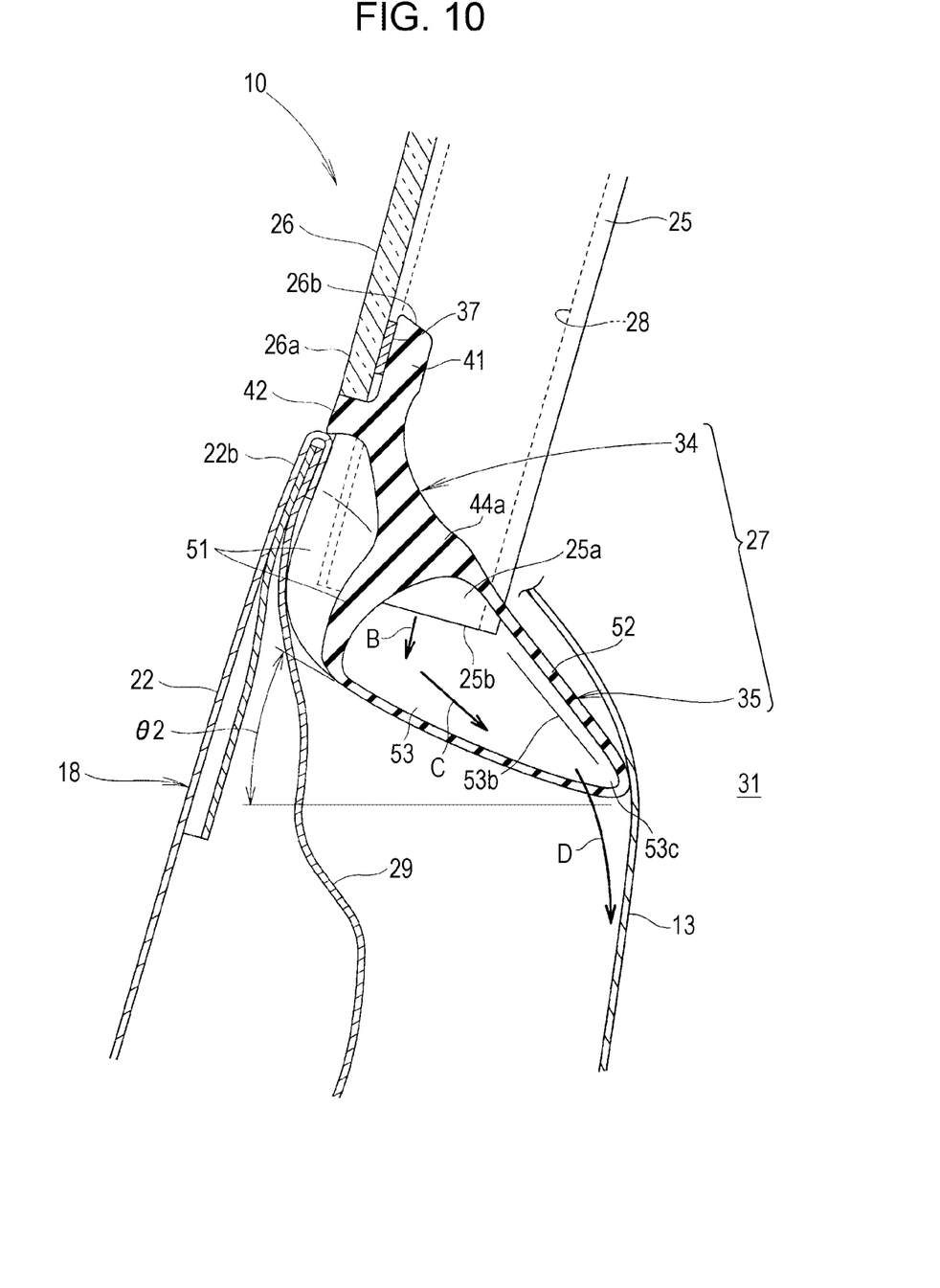
FIG. 10 is a cross-sectional view taken along line X-X in FIG. 6.

As illustrated in FIGS. 9 and 10, the receiver 35 includes: an outer wall 51 extending from a rear end 45a of the outer lip 45 to the rear of the vehicle body; an inner wall (wall) 52 extending from a rear end 44a of the inner lip 44 inward in the vehicle width direction and rearward in the vehicle body; a bottom portion 53 coupled to a lower end 52a of the inner wall 52 and a lower end 51a of the outer wall 51; and a rear wall 54 rising upward from a rear end 53a of the bottom portion 53.

The outer wall 51 is in contact with the upper front portion 22b of the front side door 18 (the door panel 22). The outer wall 51 is disposed on the outside of the vertical seal 25 (the lower end 25a) in the vehicle width direction (i.e., on the outside of the cabin 31), and extends upward from the bottom portion 53 to a space above the vertical seal 25 (the lower end 25a).

The inner wall 52 is tilted downward from the rear end 44a of the inner lip 44 toward the inside in the vehicle width direction (i.e., toward the cabin 31), and extends from the rear end 44a toward the rear of the vehicle body. A front end 52b of the inner wall 52 extends in the vehicle width direction toward the inside in the vehicle width direction, and is gradually tilted toward the rear of the vehicle body as a rear end 52c extends inward in the vehicle width direction.

In other words, the inner wall 52 is substantially trapezoidal in plan view such that the distance between the front end 52b and the rear end 52c of the inner wall 52 increases from the outside toward the inside in the vehicle width direction. Thus, the lower end 52a of the inner wall 52 has a length L1 substantially equal to a length L2 of the outer wall 51.

The bottom portion 53 is coupled to the lower end 52a of the inner wall 52 and the lower end 51a of the outer wall 51. The inner wall 52 continuously rises from an inner end 53b of the bottom portion 53 in the vehicle width direction to the rear end 44a of the inner lip 44. The rear end 44a of the inner lip 44 is located above the vertical seal 25 (the lower end 25a). Thus, the inner wall 52 rises from the bottom portion 53 to a space above the vertical seal 25 (the lower end 25a). Since the length L1 of the lower end 52a of the inner wall 52 is substantially equal to the length L2 of the outer wall 51, the bottom portion 53 is substantially rectangular in plan view.

Figure 11:
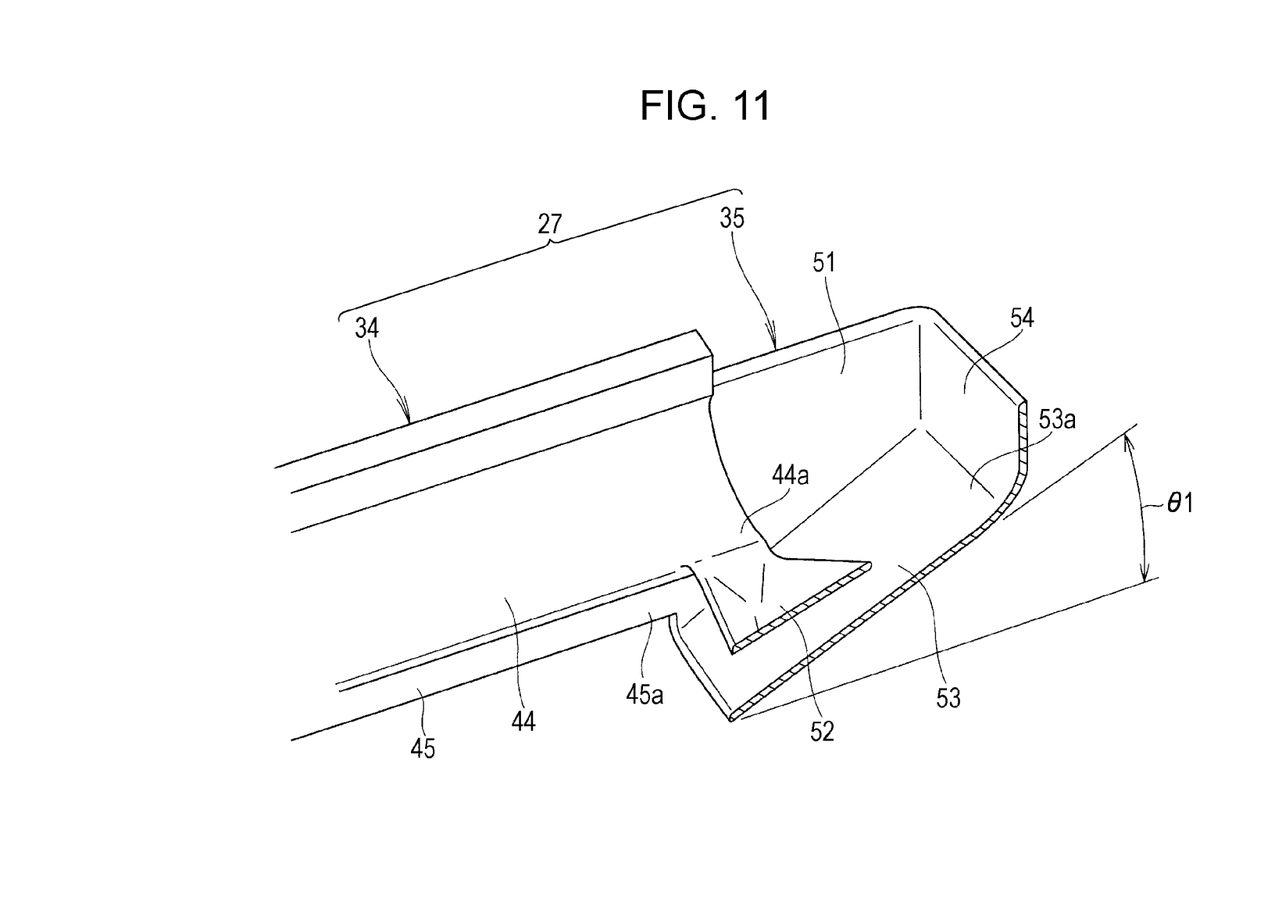
FIG. 11 is a cross-sectional view taken along line XI-XI in FIG. 9.

As illustrated in FIGS. 10 and 11, the bottom portion 53 is located below the lower end 25a of the vertical seal 25, and faces the entire lower periphery 25b of the lower end 25a (see also FIG. 6). The bottom portion 53 is tilted downward at a tilt angle θ1 toward the front of the vehicle body, and is tilted downward at a tilt angle θ2 from the outside toward the inside in the vehicle width direction. Thus, the bottom portion 53 is oriented such that a portion (hereinafter referred to as an inner front end 53c) of the inner end 53b of the bottom portion 53 closest to the front of the vehicle body is located at the lowest position. The inner front end 53c of the bottom portion 53 is in contact with the front pillar 13.

Referring back to FIGS. 9 and 10, the rear wall 54 rises from the rear end 53a of the bottom portion 53 to a space above the vertical seal 25 (the lower end 25a). The rear wall 54 is located at the rear of the lower end 25a of the vertical seal 25 in the vehicle body. The receiver 35 has a receiver opening 56 formed by the rear end 34a of the decorative portion 34, an upper end 51b of the outer wall 51, the rear end 52c of the inner wall 52, and the upper end 54a of the rear wall 54. The receiver opening 56 is larger than the lower end 25a of the vertical seal 25, and located above the lower end 25a. Thus, the lower end 25a of the vertical seal 25 is inserted into the receiver opening 56 from above.

The insertion of the lower end 25a of the vertical seal 25 into the receiver opening 56 from above enables the receiver 35 (especially the bottom portion 53) to receive water dropped from the lower end 25a of the vertical seal 25 as indicated by arrow B. Thus, it is possible to reduce the occurrence of water which has dropped from the lower end 25a of the vertical seal 25 falling onto the inner panel 29 of the front side door 18 (the door panel 22).

The bottom portion 53 is tilted downward at a tilt angle θ2 from the outside toward the inside in the vehicle width direction. Thus, water received by the bottom portion 53 can be guided toward the inside in the vehicle width direction as indicated by arrow C. That is, the water received by the bottom portion 53 does not remain in the receiver 35, but can be guided away from the inner panel 29 of the door panel 22. In this manner, it is possible to prevent water that has dropped from the lower end 25a of the vertical seal 25 from hitting the inner panel 29 and spattering into (entering) the cabin 31.

In addition, in the bottom portion 53, the inner front end 53c is located at the lowest position, and the inner front end 53c is in contact with the front pillar 13. Thus, water received by the bottom portion 53 is guided toward the inner front end 53c as indicated by arrow C, and water guided to the inner front end 53c is guided from the inner front end 53c to the front pillar 13 as indicated by arrow D. Water guided to the front pillar 13 is guided downward through the front pillar 13, and smoothly discharged downward from a lower portion of the vehicle 10.

The bottom portion 53 is tilted downward at a tilt angle θ1 (see FIG. 11) toward the front of the vehicle body. Thus, water received by the bottom portion 53 does not remain in the receiver 35, and can be guided toward the front of the vehicle body. In this manner, water received by the bottom portion 53 can be guided away from a passenger.

In addition, the receiver 35 has the inner wall 52, and the inner wall 52 continuously extends from the inner end 53b of the bottom portion 53 to a space above the lower end 25a of the vertical seal 25. Thus, spattering of water that has dropped from the lower end 25a of the vertical seal 25 toward the inside in the vehicle width direction can be reduced by the inner wall 52. This configuration ensures that water dropped from the lower end 25a of the vertical seal 25 is guided toward the front of the vehicle body, thereby suitably controlling the position to which the water received by the receiver 35 is dropped.

Figure 12A:
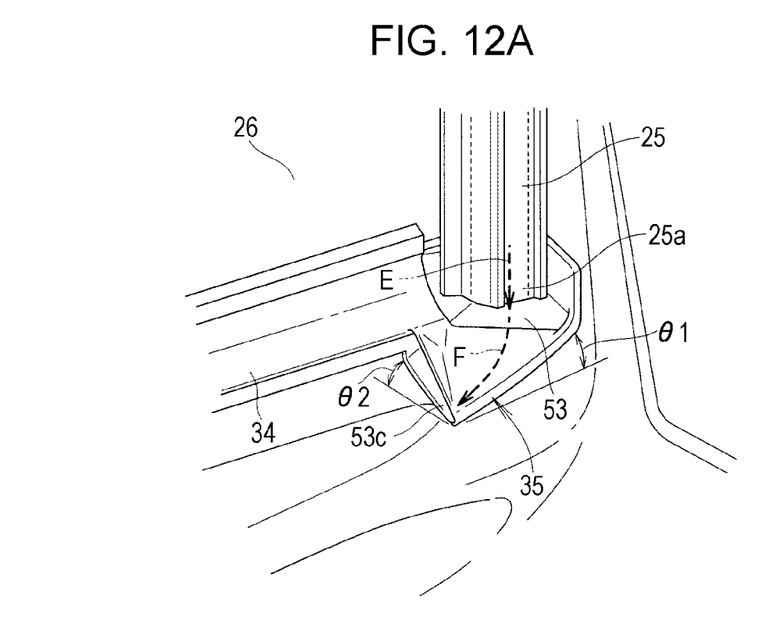
FIGS. 12A and 12B illustrate an example in which water dropped from a lower end of a vertical seal of the present embodiment is guided to a front pillar by a receiver.

An example in which water that has dropped from the lower end 25a of the vertical seal 25 is guided to the front pillar 13 by the receiver 35 will now be described with reference to FIGS. 12A and 12B. As illustrated in FIG. 12A, water drops from the lower end 25a of the vertical seal 25 to the bottom portion 53 of the receiver 35 as indicated by arrow E. The bottom portion 53 is tilted downward at the tilt angle θ1 toward the front of the vehicle body, and is tilted downward at the tilt angle θ2 from the outside toward the inside in the vehicle width direction. Thus, water that has dropped onto the bottom portion 53 flows along the bottom portion 53 toward the inside in the vehicle width direction and toward the front of the vehicle body, as indicated by arrow F. This flow of water as indicated by arrow F causes water to be guided to the inner front end 53c of the bottom portion 53.

Figure 12B:
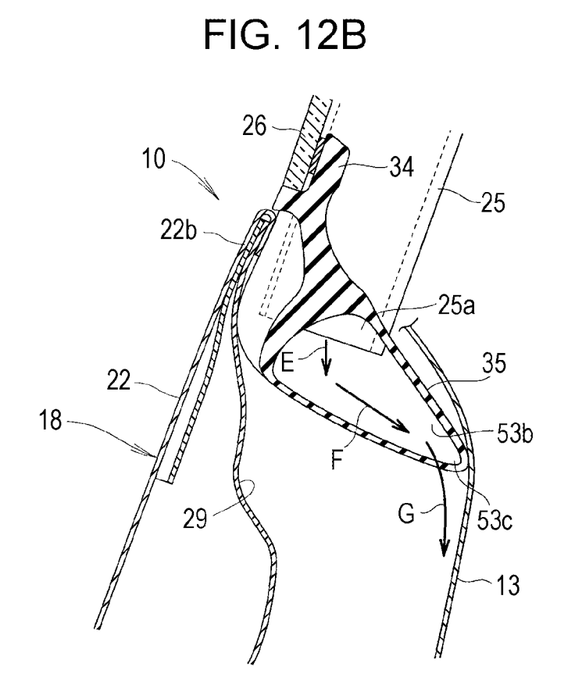

As illustrated in FIG. 12B, water guided to the inner front end 53c is guided from the inner front end 53c to the front pillar 13 as indicated by arrow G. Water guided to the front pillar 13 is guided downward through the front pillar 13, and is smoothly discharged downward from a lower portion of the vehicle 10. Thus, the occurrence of water that has dropped from the lower end 25a of the vertical seal 25 hitting the inner panel 29 of the front side door 18 can be reduced. In this manner, it is possible to prevent water that has dropped from the lower end 25a of the vertical seal 25 from splashing onto the inner panel 29 and spattering into (entering) the cabin.

The exterior member-equipped sealing structure of the present application is not limited to the foregoing embodiment, and may be appropriately modified or improved. For example, in the above embodiment, the exterior member-equipped sealing structure 20 is located adjacent to the front upper portion 17a of the door opening 17. Alternatively, the exterior member-equipped sealing structure 20 may be adjacent to a rear upper portion of the door opening 17. In this case, the exterior member is a rear corner pane located at a rear of the door opening 17 in the vehicle body, and the vertical seal 25 continuously extends from an upper portion of the door opening 17 downward to the rear of the vehicle body.

In the above embodiment, as an example, the exterior member is the front corner pane 26. Alternatively, the exterior member may be another member such as a resin decorative member.

The shapes and configurations of, for example, the vehicle, the vehicle body, the door opening, the exterior member-equipped sealing structure, the sealing member, the vertical seal, the front corner pane, the decorative member, the inner panel, the decorative portion, the receiver, the inner wall, and the bottom portion are not limited to those described in the embodiment, and may be changed or modified as necessary.

An exterior member-equipped sealing structure of the present application is suitably applied to a vehicle including a sealing member that seals a gap between a door and a door opening of a vehicle body with the door covering the door opening.

What is claimed is:
1. An exterior-member-equipped sealing structure comprising:
   a sealing member disposed on a door opening of a vehicle body to seal a gap between a door and the door opening when the door opening is closed by the door;
   a vertical seal included in the sealing member and continuously extending down from an upper portion of the door opening toward a front side or a rear side with respect to the vehicle body;
   an exterior member disposed in contact with an outer side of the vertical seal with respect to a vehicle width direction such that the exterior member directly contacts the outer side of the vertical seal, the exterior member constituting an exterior of the vehicle body, the exterior member being located on the front side or the rear side of the door opening; and
   a decorative member located at a lower end of the exterior member to cover a bottom surface of the lower end of the exterior member, wherein
   the decorative member includes a decorative portion connected to the bottom surface of the exterior member and covering the bottom surface of the exterior member, and a receiver portion continuously extending from the decorative portion to a space under a lower end of the vertical seal and covering the lower end of the vertical seal, wherein the receiver portion is inclined down from an outside toward an inside with respect to the vehicle width direction, and wherein when the door opening is closed by the door, an inner panel of the door is positioned vertically below the decorative member and disposed on an outer side of the vehicle body, and the inner panel of the door contacts the decorative member, wherein the decorative member provides a seal structure between the door and the vehicle body such that when the door is closed, an outer surface of the receiver portion directly contacts the inner panel of the door and an inner surface of the receiver portion directly contacts the vehicle body, and wherein the seal structure is terminated in a vertical direction at the receiver portion such that no seal structure located below the receiver portion is connected to the receiver portion.

2. The exterior-member-equipped sealing structure according to claim 1, wherein the receiver portion includes a bottom portion facing an entire periphery of the lower end of the vertical seal.

3. The exterior-member-equipped sealing structure according to claim 2, wherein the receiver portion is inclined down to a front of the vehicle body.

4. The exterior-member-equipped sealing structure according to claim 2, wherein the receiver portion includes a first wall continuously extending from an inner end of the bottom portion with respect to the vehicle width direction to a portion above the lower end of the vertical seal.

5. The exterior-member-equipped sealing structure according to claim 4, wherein the receiver portion includes a receiver opening, wherein the lower end of the vertical seal is inserted into the receiver opening, and wherein an edge of the first wall defines the receiver opening.

6. The exterior-member-equipped sealing structure according to claim 5, wherein the bottom portion is inclined down from an outside toward an inside with respect to the vehicle width direction, and the first wall extends over the bottom portion.

7. The exterior-member-equipped sealing structure according to claim 5, wherein the bottom portion is inclined down to the front of the vehicle body, and the first wall extends over the bottom portion.

8. The exterior-member-equipped sealing structure according to claim 1, wherein the decorative member is terminated in a lateral extending direction of the decorative member at the receiver portion.

9. The exterior-member-equipped sealing structure according to claim 1, wherein the door extends longitudinally beyond the vertical seal to a position under the exterior member such that when the door is opened, a part of the vehicle body located under the exterior member is exposed.

10. The exterior-member-equipped sealing structure according to claim 9, wherein the decorative member provides the seal structure between the door and the vehicle body such that when the door is closed, an outer surface of the decorative portion under the exterior member directly contacts the inner panel of the door and an inner surface of the decorative portion directly contacts the vehicle body.

11. The exterior-member-equipped sealing structure according to claim 1, wherein the receiver portion is inclined down toward the decorative portion.

* * * * *